Sept. 27, 1966   R. G. MEYERAND, JR., ETAL   3,275,859
INSULATING VANES FOR LINEAR MHD DEVICES
Filed Oct. 2, 1961
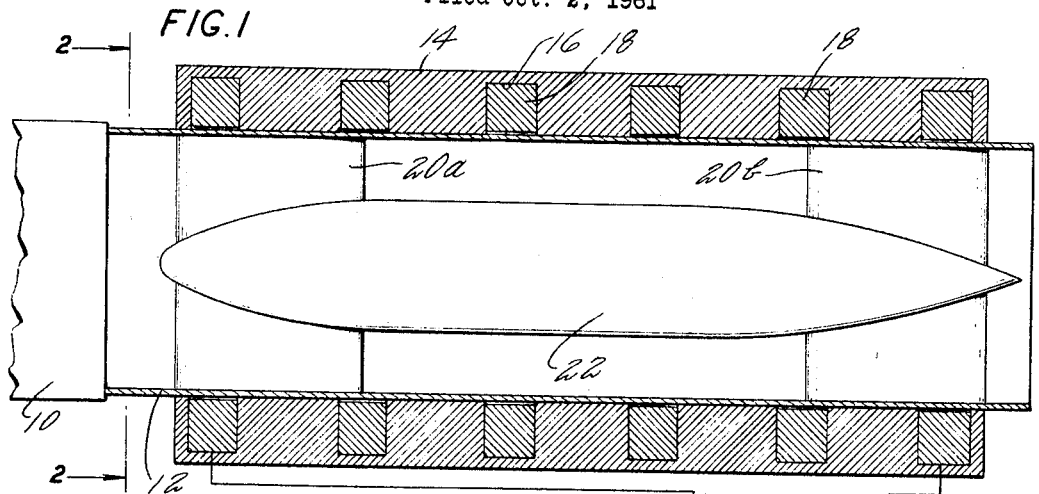
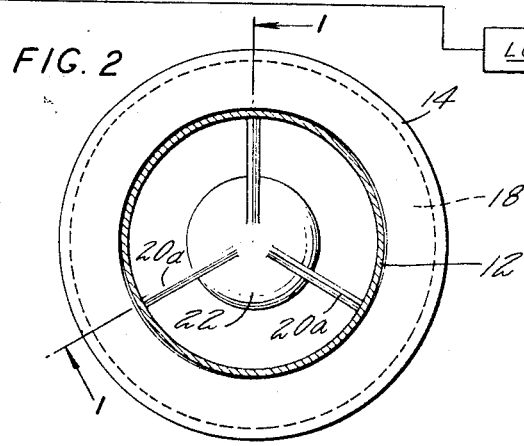
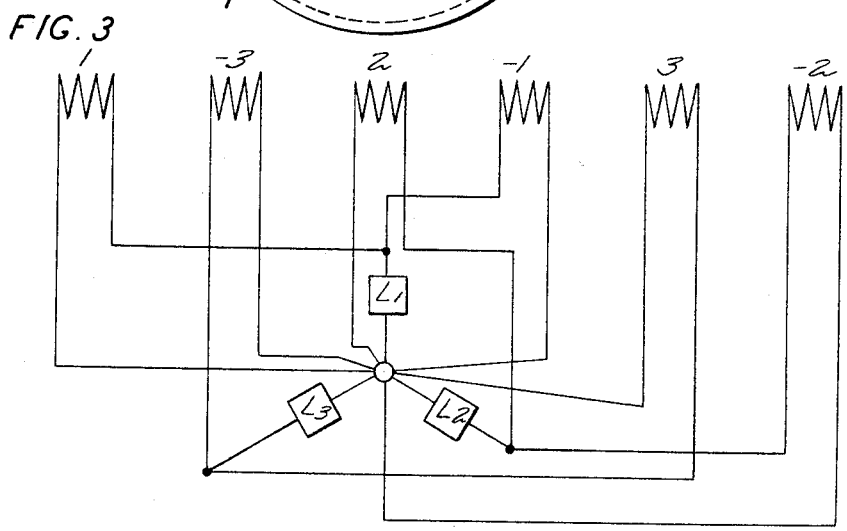
INVENTORS
EDMUND C. LARY
RUSSELL G. MEYERAND JR.
BY David S. Fishman
ATTORNEY

United States Patent Office 3,275,859
Patented Sept. 27, 1966

3,275,859
INSULATING VANES FOR LINEAR MHD DEVICES
Russell G. Meyerand, Jr., Glastonbury, and Edmund C. Lary, Vernon, Conn., assignors to United Aircraft Corporation, East Hartford, Conn., a corporation of Delaware
Filed Oct. 2, 1961, Ser. No. 142,263
7 Claims. (Cl. 310—11)

This invention relates to alternating current magnetohydrodynamic (hereinafter referred to as MHD) devices. More particularly, it relates to insulating vanes for alternating current linear MHD devices to enhance the penetration of the magnetic field into the conducting fluid.

A serious obstacle in the development of high performance A.C. linear MHD devices is the lack of adequate magnetic field penetration into the conducting fluid. Adequate penetration of the magnetic field into the fluid without incurring unacceptable losses is presently impossible because the magnetic field induces circulating azimuthal currents in the conducting fluid which impede the penetration of the magnetic field into the fluid. These losses greatly reduce the efficiency of the device, and resort must be made to such steps as significantly lengthening the energy exchange portion of the device to obtain proper penetration, or seeding and quenching the conducting fluid. From the standpoints of compactness, efficiency, and simplicity, it is preferable to avoid such lengthening and seeding both in open systems and closed systems; and, in particular, seeding is most impracticable for closed systems.

The present invention teaches the use of axially extending insulating vanes at or immediately adjacent the inlet and exit of the energy exchange portion of an A.C. linear MHD device. The insulating vanes at the inlet interrupt the circulating azimuthal currents, thereby eliminating the resistance to penetration of the magnetic field and allowing deep penetration of the magnetic field into the conducting fluid. The vanes at the exit also serve to eliminate the azimuthal currents induced by removing the field from the fluid, thereby facilitating the removal of the field. Thus, the present invention produces easy and deep penetration of the magnetic field into the conducting fluid and provides for ease of removal of the field. Azimuthal currents circulate in the fluid in the energy exchange region, and these currents are stronger and more effective for inductive action because there is improved coupling between the field and the fluid, a stronger field being embedded into the fluid by the action of the insulating vanes.

In addition, the insulating vanes are used to support a ferromagnetic centerbody extending the length of the energy exchange portion of the MHD device. This centerbody further serves to draw the magnetic field deeply into the conducting fluid to improve the operation of the MHD device.

Accordingly, one feature of the present invention is a novel A.C. linear MHD device in which magnetic field penetration into the conducting fluid is greatly enhanced.

Another feature of the present invention is a novel A.C. linear MHD device incorporating insulating vanes at the inlet and exit to the energy exchange area to interrupt circulating azimuthal currents and enhance penetration of the magnetic field.

Still another feature of the present invention is a novel A.C. linear MHD device incorporating insulating vanes at the inlet and exit to the energy exchange area and having a magnetic centerbody extending between and supported by the vanes.

Still another feature of the present invention is a novel A.C. linear MHD device in which an axially traveling magnetic field is generated in axially displaced coils for interaction with a conducting fluid, and in which insulating inlet and exit vanes extend into the conducting fluid, the size and position of the vanes being a function of the wave length of the magnetic field.

Other features and advantages will be apparent from the specification and claims, and from the accompanying drawings which illustrate an embodiment of the invention.

FIG. 1 is a sectional view taken along line 1—1 of FIG. 2 of an A.C. linear MHD device incorporating the present invention.

FIG. 2 is a view along line 2—2 of FIG. 1.

FIG. 3 is a wiring diagram for an A.C. linear MHD device incorporating the present invention.

Although the following detailed description will relate to the application of the present invention to an A.C. linear MHD generator operating on an induction principle, it is to be expressly understood that the present invention is not limited to this embodiment but may be used in connection with other types of A.C. linear MHD devices such as electromagnetic pumps.

Referring now to FIG. 1, conducting fluid is delivered from fluid supply source 10. The source 10 may be selected from several available alternatives; it may be the high temperature exhaust gas from a gas turbine, or any ionized conducting gas supply, or it may be a pump delivering a conducting fluid. In the present embodiment, supply source 10 consists of a nozzle delivering a conducting ionized gas at a predetermined velocity and pressure. Conduit 12 is connected to the discharge from supply 10, and the conducting fluid flows through conduit 12 from left to right. A part of conduit 12 is surrounded by a magnetic outerbody 14 having annular slots 16 therein. Each slot contains a coil 18, each coil consisting of a number of turns of wire.

A number of streamlined vanes 20a and 20b extend radially inward from the wall of conduit 12, the vanes 20a and 20b being inlet and exit vanes respectively for an energy exchange area to be discussed hereinafter. A streamlined magnetic centerbody 22 is centered in conduit 12 and extends between and is supported by the vanes 20a and 20b. The principal purpose of the vanes is to interrupt circulating azimuthal currents, and this principal purpose will be discussed more fully hereinafter. A secondary purpose of the vanes is to support the centerbody 22, and as can best be seen in FIG. 2, three inlet and three exit vanes are used for this secondary purpose to provide optimum support and stability for centerbody 22 without unnecessarily hampering flow through conduit 12. Furthermore, the streamlined shapes of the vanes and the centerbody minimize the interference to flow through conduit 12 caused by their presence. Of course, it should be apparent that any number of vanes could be used, and three inlet and three exit vanes have been chosen merely to illustrate the preferred embodiment for achieving the optimum compromise in balancing the requirements for supporting centerbody 22 with the need for minimizing interference with flow through conduit 12.

Fluid source 10, conduit 12, magnetic centerbody 22, and coils 18 with a proper load connected thereto constitute the essential elements of a self-excited A.C. linear MHD generator operating on an induction principle. The conducting fluid is delivered from source 10 and is caused to flow through conduit 12 at a predetermined velocity. A polyphase A.C. current is passed through coils 18 to generate an axially traveling magnetic field in the direction of conducting fluid flow at a lower velocity than the velocity of the conducting fluid. In theory, magnetic centerbody 22 draws the field radially into conduit 12 to cause the field to penetrate into the flowing conducting fluid. The slip between the magnetic field and the conducting fluid generates circulating azimuthal currents in the conducting fluid and these currents in turn generate an E.M.F. in coils 18 which can be used to perform work. The performance of this device is dependent upon the penetration of the magnetic field into the conducting fluid. However, the circulating azimuthal currents established by the penetration of the field into the conducting fluid have the effect of inhibiting penetration of the field into the conducting fluid. Therefore, unless the system is complicated by seeding of the conducting fluid, the generator must be significantly lengthened in order to obtain sufficient penetration of the field to produce a satisfactory device. A similar problem exists in removing the field from the fluid at the exit from the energy exchange area of the generator because removing the field also generates circulating azimuthal currents which impede the removal.

The present invention overcomes the problems of penetration of the field into the conducting fluid and removal of the field by the use of insulating inlet vanes 20a and insulating exit vanes 20b at the inlet and exit of the energy exchange region of the generator. Insulating inlet vanes 20a interrupt and impede the flow of the circulating azimuthal currents over the length of these vanes. Since there are no circulating azimuthal currents in the area of inlet vanes 20a the opposition to the penetration of the magnetic field to the conducting fluid is eliminated and deep penetration into the fluid is accomplished. Magnetic centerbody 22 assists in drawing the field radially into conduit 12 and acts as a low impedance or short circuit path for field flux. Thus, as the conducting fluid flows between the adjacent edges of vanes 20a and 20b, designated the energy exchange area, the field is embedded in the conducting fluid and circulating azimuthal currents are generated in this area. As the conducting fluid passes over insulating exit vanes 20b, the circultaing azimuthal currents are again interrupted and the field can be easily removed from the fluid. Magnetic outerbody 14 provides a low impedance or short circuit return path for the flux. Tests have demonstrated that the use of the insulating inlet vanes 20a and insulating exit vanes 20b to deposit and extract the magnetic field produce a penetration of the field into the conducting fluid which, depending on the number and arrangement of the vanes, is from seventeen to thirty-five times as great as could be achieved without the use of these insulating vanes. The circulating azimuthal currents which are allowed to flow in the energy exchange area are stronger because the deeper penetration of the field results in better coupling between the field and the conducting fluid. Hence, a significant improvement in performance of the generator results. A further improvement in performance of the generator is realized because the azimuthal currents eliminated by the vanes perform no work and merely serve to heat the conducting fluid when present.

For optimum operation of the improved generator, the length of the coil region must be an integral number of wave lengths of the magnetic field and at least one wave length. One possible configuration is to place the insulating vanes entirely outside the coil region. In this arrangement, the inlet vanes 20a are adjacent to and upstream of the upstreammost coil with the trailing edges immediately upstream of the upstreammost coil; and exit vanes 20b are adjacent to and downstream of the downstreammost coil with the leading edges of vanes 20b being immediately downstream of the downstreammost coil. In this configuration, the energy exchange area between the adjacent edges of the vanes 20a and 20b extends over the entire coil region, and only the fringe flux is embedded into the conducting fluid by the action of the vanes. This is a possible configuration but is not the most desirable.

The most desirable configuration is that shown in FIG. 1 wherein the insulating inlet and exit vanes are partly located under some of the coils. The coils surrounding the vanes are designated trim coils and the area between the adjacent edges of the vanes under the remaining coils constitutes the energy exchange area. When positioned under the trim coils as shown in FIG. 1, the inlet and exit vanes interrupt the flow of large amounts of circulating azimuthal currents and these vanes are employed at maximum efficiency for depositing and extracting the field from the conducting fluid. As can be seen in FIG. 1, inlet vane 20a extends slightly upstream of the upstreammost coil and he exit vane 20b extends slightly downstream of the downstreammost coil. These extensions of the vanes beyond the coil extremities serve to interrupt the circulating azimuthal currents generated by the fringe flux of the field.

When the vanes are partly positioned under trim coils as shown in FIG. 1 the total length of the coil region must still be an integral number of wave lengths of the magnetic field and at least one wave length for optimum performance. If the number of coils per wave length is equal to the number of phases to be employed in the external load, then the total length under the coils of one inlet vane and one exit vane should be one wave length of the magnetic field, preferably divided equally between the vanes, and the distance between the adjacent edges of the vanes should be at least one wave length.

In the configurations shown in FIGS. 1 and 3, the number of coils per wave length of the magnetic field is double the number of phases employed in the external circuitry, the boxes L1, L2 and L3 of FIG. 3 indicating a three-phase external load connected to the coils 18. FIGS. 1 and 3 depict the situations in which the number of coils per wave length is double the number of phases employed in the external circuitry, and in this instance, the coils are connected to the external load as shown in FIG. 3. The numbers 1, −3, 2, −1, 3, −2, associated with the various coils in FIG. 3 indicate the phase sequence (1, 2, 3) of the loads to which the coils are connected, the minus signs indicating a phase shift of 180° obtained by reverse connection of those coils to the corresponding phase of the load. The configuration shown in FIGS. 1 and 3 provides a smoother magnetic field for the MHD generator than is achieved with the previously mentioned configuration wherein the number of coils per wave length is equal to the number of phases in the external load. Moreover, in the configuration of FIGS. 1 and 3 maximum efficiency of the vanes can be achieved by having the total length under the coils of one inlet vane and one exit vane equal to one half wave length of the magnetic field preferably divided equally between the inlet and exit vanes, and the energy exchange area between adjacent edges of the vanes is then equal to an integral number of wave lengths of the magnetic field minus one half wave length. As can be seen in FIG. 1, the inlet and exit vanes are once again extended slightly beyond the extremities of the coils to account for fringe flux.

Regardless of the positioning of the vanes with respect to the coils, the external load should include a means such as a synchronous alternator for adjusting the power factor of the load to provide self-excitation of the magnetic field.

It is to be understood that the invention is not limited to the specific embodiment herein illustrated and described, but may be used in other ways without departure from its spirit as defined by the following claims.

We claim:

1. In an alternating current magnetohydrodynamic device having a conduit for the passage of a conducting fluid, a plurality of axially spaced coils surrounding at least part of said conduit, said coils being adapted to receive an alternating current and to generate an axially traveling magnetic field, at least one inlet vane extending from the wall of said conduit into said conduit, at least part of said inlet vane being positioned under the upstreammost coil and extending downstream for a distance equal to an integral number of quarter wave lengths of said magnetic field, and at least one exit vane extending from the wall of said conduit into said conduit, said inlet vane and said exit vane being spaced apart axially, at least part of said exit vane being positioned under the downstreammost coil and extending upstream for a distance equal to an integral number of quarter wave lengths of said magnetic field, the distance between the adjacent edges of said vanes forming an energy exchange region and being an integral number of wave lengths minus the length of said vanes under the coils and at least one half wave length.

2. An alternating current magnetohydrodynamic device as in claim 1 including a magnetic centerbody extending between and supported by said vanes.

3. In an alternating current magnetohydrodynamic device having a conduit for the passage of a conducting fluid, a plurality of axially spaced coils surrounding at least a part of said conduit, said coils being adapted to receive an alternating current and to generate an axially traveling magnetic field, at least one inlet vane extending from the wall of said conduit into said conduit, at least part of said inlet vane being positioned under the upstreammost coil and extending downstream, at least one exit vane spaced from said inlet vane and extending from the wall of said conduit into said conduit, at least part of said exit vane being positioned under the downstreammost coil and extending upstream, the distance between the adjacent edges of said vanes being an integral number of wave lengths of the field minus the length of the vanes under the coils and at least one half wave length to thereby form an energy exchange region between said inlet and exit vanes, the sum of the lengths of said inlet vane and said exit vane under the coils equaling an integral number of half wave lengths.

4. In an alternating current magnetohydrodynamic device having a conduit for the passage of a conducting fluid,
a plurality of axially spaced coils surrounding at least part of said conduit, said coils being adapted to receive an alternating current and to generate an axially traveling magnetic field,
at least one inlet vane extending from the wall of said conduit into said conduit immediately upstream of the energy exchange area of the magnetohydrodynamic device, at least part of said inlet vane being under the upstreammost coil and extending downstream for a distance equal to an integral number of quarter wave lengths of the magnetic field,
and at least one exit vane extending from the wall of said conduit into said conduit immediately downstream of the energy exchange area of the magnetohydrodynamic device, at least part of said exit vane being under the downstreammost coil and extending upstream for a distance equal to an integral number of quarter wave lengths of the magnetic field,
the distance between the adjacent edges of said inlet and exit vanes forming an energy exchange region and being equal to an integral number of wave lengths of the magnetic field minus the length of the vanes under the coils and equal to at least one half wave length of the magnetic field.

5. In an alternating current magnetohydrodynamic device having a conduit for the passage of a conducting fluid,
a plurality of axially spaced coils surrounding at least part of said conduit, said coils being adapted to receive an alternating current and to generate an axially traveling magnetic field,
at least one inlet vane extending from the wall of said conduit into said conduit immediately upstream of the energy exchange area of the magnetohydrodynamic device, at least part of said inlet vane being under the upstreammost coil and extending downstream,
and at least one exit vane extending from the wall of said conduit into said conduit immediately downstream of the energy exchange area of the magnetohydrodynamic device, at least part of said exit vane being under the downstreammost coil and extending upstream,
the distance between the adjacent edges of said inlet and exit vanes forming an energy exchange region and being an integral number of wave lengths of the magnetic field minus the length of said vanes under the coils, the sum of the length of said inlet vane and said exit vane under the coils equaling an integral number of half wave lengths.

6. In an alternating current magnetohydrodynamic device having a conduit for the passage of a conducting fluid,
means for generating a magnetic field along the length of said conduit, said magnetic field interacting with said conducting fluid to generate azimuthal currents in said conducting fluid,
and vane means extending from the wall of said conduit into said conduit and extending longitudinally along said conduit for interrupting part of said azimuthal currents to facilitate penetration of said magnetic field into said conducting fluid.

7. An alternating current magnetohydrodynamic device having a conduit for the passage of a conducting fluid,
a plurality of axially spaced coils surrounding at least a part of said conduit, said coils being adapted to receive an alternating current and to generate a magnetic field along the length of said conduit, said magnetic field interacting with said conducting fluid to generate circulating azimuthal currents in said conducting fluid,
means including a plurality of vanes for interrupting part of said azimuthal currents to facilitate penetration of said magnetic field into said conducting fluid, said vanes extending from the wall of said conduit radially into said conduit and also extending longitudinally along said conduit beginning from substantially adjacent the upstream-most coil and extending a distance downstream, said vanes forming a plurality of separate longitudinally extending passages for passage of said fluid,
and an energy exchange region in said conduit immediately downstream from the downstream-most extension of said vanes whereby said conducting fluid generates a voltage in said coils.

References Cited by the Examiner

UNITED STATES PATENTS

| | | | |
|---|---|---|---|
| 1,717,413 | 6/1929 | Rudenburg | 310—11 |
| 2,702,004 | 2/1955 | Blake | 310—11 X |
| 3,122,663 | 2/1964 | Kach | 310—11 |
| 3,214,614 | 10/1965 | Maeder | 310—11 |

FOREIGN PATENTS 738,511  10/1959  Great Britain.

MILTON O. HIRSHFIELD, *Primary Examiner.*

J. A. HINKLE, D. X. SLINEY, *Assistant Examiners.*